United States Patent [19]

Teyssié et al.

[11] Patent Number: 5,292,591
[45] Date of Patent: Mar. 8, 1994

[54] STABILIZATION OF DISPERSIONS OF METAL OXIDES AND/OR CARBON BLACK IN WATER

[75] Inventors: Philippe J. Teyssié, Neuville en Condroz; Luc E. Leemans, Diepenbeek; Walter A. Verdyck, Schoten; Nikolaas C. de Jaeger, Hove, all of Belgium

[73] Assignee: AGFA-Gevaert, N.V., Mortsel, Belgium

[21] Appl. No.: 28,176

[22] Filed: Mar. 9, 1993

Related U.S. Application Data

[62] Division of Ser. No. 727,446, Jul. 9, 1991, Pat. No. 5,200,456.

[30] Foreign Application Priority Data

Jul. 10, 1990 [EP]  European Pat. Off. ........ 90201849.8

[51] Int. Cl.$^5$ ............................................. B32B 27/30
[52] U.S. Cl. ..................................... 428/522; 101/453; 101/457; 428/323; 428/328

[58] Field of Search ............... 428/328, 323, 408, 463, 428/522; 101/453, 457; 524/430, 431, 432, 433, 495, 496, 497, 501, 503, 505, 533, 847

[56] References Cited

U.S. PATENT DOCUMENTS

| 2,833,661 | 5/1958 | Iler ........................................ 524/430 |
| 3,971,660 | 7/1976 | Staehle ..................................... 96/33 |
| 4,243,430 | 1/1981 | Sperry et al. ................... 106/308 M |
| 4,276,367 | 6/1981 | Merrill et al. ...................... 430/302 |
| 4,967,819 | 11/1990 | Kansupada .......................... 152/524 |

*Primary Examiner*—Paul J. Thibodeau
*Assistant Examiner*—D. S. Nakarani
*Attorney, Agent, or Firm*—Breiner & Breiner

[57] ABSTRACT

According to the present invention a dispersant is provided for stabilizing dispersions of metal oxides and/or carbon black in water in the presence of a hydrophilic binder. Said dispersant is a block-copolymer comprising at least one block of an ammonium group containing (meth)acrylate.

5 Claims, No Drawings

STABILIZATION OF DISPERSIONS OF METAL OXIDES AND/OR CARBON BLACK IN WATER

This is a division of application Ser. No. 07/727,446 filed Jul. 9, 1991, now U.S. Pat. No. 5,200,456.

DESCRIPTION

1. Field of the Invention

The present invention relates to a dispersant for the stabilization of a dispersion of metal oxides and/or carbon black in water in the presence of a hydrophilic binder.

2. Background of the Invention

Dispersions of metal oxides and/or carbon black in water are used in a variety of applications. For example a dispersion of $TiO_2$ in water in the presence of polyvinyl alcohol as a hydrophilic binder can be used as a hydrophilic coating layer on a substrate such as polyester to produce a lithographic printing plate as described in U.S. Pat. No. 3,971,660, DE-P-1900469 and DE-P-2030634. A dispersion of $TiO_2$ carbon black in water in the presence of polyvinyl alcohol is used for the production of a lithographic printing plate using an electrophotographic imaging technique as described in the European patent application no. 89201696.5 filed on 28.6.89.

The lithographic printing plate described in said application is produced by coating to a support a dispersion of $TiO_2$ and carbon black in water whereby polyvinylalcohol is used as a hydrophilic binder. The dispersion further contains a tetraalkylorthosilicate hardening agent for hardening the coated layer. Because there is often a long time between the preparation and coating of the dispersion it is advantageous that the hardening agent can be added to the dispersion just before coating to avoid hardening of the dispersion during storage. However it has been found that for obtaining a stable dispersion the hardening agent needs to be added during preparation of the dispersion.

It is further known, i.e. see for example BE 797173 that the lithographic properties of a printing plate are influenced by the quality of the layers contained on the support of the printing plate and especially by the stability of dispersions of pigments used in the layer(s) of the printing plate.

Dispersions of metal oxides are also very important to the ceramic processing. Colloidal processing methods for the processing of ceramic powders is one of the promising techniques in ceramic processing (see e.g. R. W. Rice "Ceramic processing: an overview" in Aiche Journal april 1990 vol. 36 no. 4 page 481). Polymeric binders are preferably used in these colloidal processing methods. Since it is known that agglomerates can produce defects in the resulting ceramic, it is very important that the stability of metal oxides dispersions can be sufficiently controlled during colloidal processing.

Dispersions of metal oxides are also often used in photographic materials to increase the strength of silver halide emulsion layers. Furthermore, other layers in photographic materials such as backing layers, antihalation layers and anti-stress layers often contain metal oxides and/or carbon black. These layers are produced by aqueous coating methods and hydrophilic polymers are mostly used as thickening agents.

Finally dispersions of metal oxides are used in the production of paintings.

From the above description it is clear that a need exists for stable dispersions of metal oxides and/or carbon black in water in the presence of a hydrophilic binder.

It is an object of the present invention to provide a dispersant for stabilizing dispersions of metal oxides and/or carbon black in water in the presence of a hydrophilic binder.

Other objects of the present invention will become clear from the description hereinafter.

SUMMARY OF THE INVENTION

According to the present invention a dispersant is provided for stabilizing dispersions of metal oxides and/or carbon black in water in the presence of a hydrophilic binder. Said dispersant is a block-copolymer which comprises at least one block of a (meth)acrylate monomer that contains an ammonium group.

DETAILED DESCRIPTION OF THE INVENTION

It has surprisingly been found that dispersions of metal oxides and/or carbon black in water in the presence of a hydrophilic binder can be stabilized using a block-copolymer comprising at least one block of a methacrylate or acrylate monomer of general formula (I):

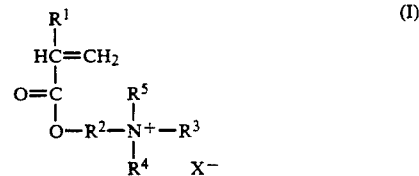

wherein $R^1$ represents a methyl group or hydrogen, each of $R^3$, $R^4$ and $R^5$ which may be the same or different represent a hydrogen, an alkyl, aryl or alkylaryl group, $R^2$ represents a divalent organic group e.g. alkylene such as methylene, ethylene, propylene, arylene such as phenylene, mixed alkylene arylene such as xylylene, $X^-$ represents an anion e.g. a halide ion such as chloride, bromide, iodide, alkyl or aryl sulphate such as methyl sulphate, p-toluene sulphate etc.

Typical examples of said monomers corresponding to general formula (I) are:

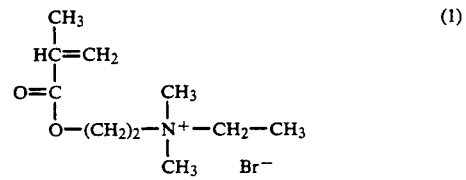

(1)

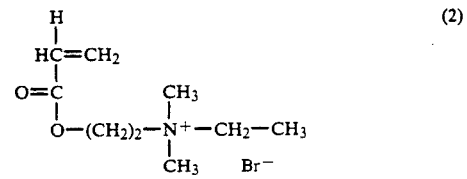

(2)

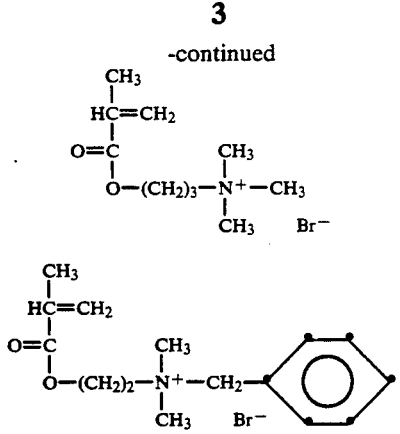

The block-copolymers according to the present invention may be of the linear type or grafted type. The block-copolymers may also comprise more than one block of a methacrylate or acrylate monomer corresponding to the above general formula (I) in addition to other blocks and the different blocks may be repeated more than once. Preferably used are block-copolymers containing only two blocks one of which is a block of a methacrylate or acrylate monomer corresponding to general formula (I).

The block-copolymers according to the present invention are prepared by anionic copolymerization of a vinyl monomer and an amino-group containing (meth-)acrylate monomer. Thus a block of a first monomer e.g. a vinyl monomer is first prepared using the anionic copolymerization. When all vinyl monomer is consumed by the polymerization a second monomer e.g. an amino group containing (meth)acrylate monomer is introduced in the reaction mixture so that this second monomer continues the polymerization at the end of the first still 'living' block. Other monomers may then be added to obtain block-copolymers containing more than two blocks. The thus obtained block-copolymer is subsequently quaternized using a quaternizing agent such as e.g. alkyl bromides, alkylaryl bromides, alkyl chlorides, alkyl iodides or an acid such as hydrochloric acid or hydrobromic acid may be used. A preferably used quaternizing agent is ethyl bromide.

Co-blocks that can be polymerized with said blocks which consist of a monomer corresponding to general formula (I) are blocks of vinyl monomers such as styrene, alpha-methylstyrene, alkylmethacrylate, alkylacrylate, vinyl acetate, vinyl alcohol, vinyl chloride, vinylidene chloride etc. Preferably used are blocks of alpha-methylstyrene or methyl methacrylate.

Metal oxides that can be stabilized in water in the presence of a hydrophilic binder using said block-copolymers of the present invention are e.g. ZnO, TiO$_2$, Al$_2$O$_3$, PbO, CuO, Bi$_2$O$_3$, etc.

The hydrophilic binders suitable for use with the present invention are preferably hydrophilic polymers such as e.g., polyvinyl actetate hydrolyzed to an extent of at least 60%, polyacrylamides and copolymers thereof, gelatin, cellulose derivatives such as carboxy methyl cellulose, polyvinyl pyrrolidone and copolymers thereof, polyvinyl pyridinium and copolymers thereof, etc. and mixtures thereof. Polyvinyl alcohol is preferably used in accordance with the present invention.

It has further been found that a dispersion of TiO$_2$ and/or carbon black in water in the presence of polyvinylalcohol as a binder shows no agglomeration when additional substances such as a tetraalkylsilicate hardening agent are added to the dispersion after its preparation which shows the excellent stability of the dispersions.

The following examples illustrate the present invention without limiting thereto. The percentages given are by weight unless otherwise stated.

EXAMPLE 1

In a thorougly dried 3000 ml balloon flask, kept under pressure with high purity nitrogen, fitted with a three way septum equipped valve, 1500 ml of tetrahydrofuran (THF) were introduced through the septum by means of a stainless steel capillary. The THF solvent was previously dried on calcium hydride and distilled from a benzophenone sodium solution.

To the magnetically stirred solvent, 7 ml (53.8 remoles) of alphamethylstyrene, previously dried and distilled from calcium hydride and fluorenyl lithium respectively, were added through the septum with a nitrogen blanketed syringe.

A 1.3M sec-butyllithium solution in heptane was dropwise added at ambient temperature to the above prepared THF solution, until appearance of a persistent red coloration due to formation of alpha-methylstyryl carbanions. Approximately 0.1 ml of the sec-butyllithium solution were then needed. A further 11 ml of said 1.3M sec-butyllithium solution were added.

The balloon flask was cooled to $-78°$ C. by immersion in a bath containing an acetone dry ice mixture. To the stirred solution at $-78°$ C., 8m] of alpha-methylstyrene (61.5 remoles) were added. Before addition alpha-methylstyrene was dried and distilled from calcium hydride and subsequently mixed with fluorenyllithium and distilled.

After 45 minutes 75 ml (445.7 remoles) of N,N-dimethyl-aminoethyl methacrylate (DMAEMA) were added at $-78°$ C. Prior to injection DMAEMA monomer was cooled to about $-40°$ C. Before addition DMAEMA was dried on calcium hydride and distilled therefrom, whereupon a 1M triethyl aluminum solution in heptane was added dropwise to the cooled monomer (about $-40°$ C.) just until appearance of the greenish colour of the monomer-triethyl aluminum complex, and distilled again. After 1 hour the living polymer was killed by addition of 20 ml of methanol. The THF solvent was removed under reduced pressure.

After drying under vacuum 82.3 g of polymer were obtained.

30 g of the thus obtained block-copolymer was dissolved in 400 ml anhydrous THF. 200m) freshly distilled ethyl bromide were added. The solution was refluxed for 50 hours in a 1000 ml balloon flask equipped with a reflux condenser in an oil bath. Excess ethyl bromide and THF were removed under reduced pressure. A block-copolymer of alpha-methylstyrene and N,N-dimethyl-N-ethyl-(2-(methacryloyloxy)-ethyl)ammonium bromide was thus obtained.

EXAMPLE 2

Using the same experimental conditions as described in example I a second block-copolymer was prepared as follows.

To 800 ml of THF, dried as described in example 1 and contained in a 2000 ml balloon flask, 3.28 remoles of 1,1-diphenyl-3-methylpentyllithium dissolved in THF was added. The reactor was cooled to $-78°$ C. and 74.8 remoles of methyl methacrylate, cooled to −40° C., were added. The color of the reaction medium changed from red to yellow. The methyl methacrylate monomer used was previously purified by drying on calcium hydride and distillation followed by addition of triethyl-aluminum and distilled again.

After 1 hour 231.8 remoles of DMAEMA were added and after another hour the living polymer was killed and the THF solvent was removed under reduced pressure. 42.7 g of polymer were obtained.

The thus obtained polymer was quaternized with ethyl bromide according to the procedure described in example 1. A bock-copolymer of methylmethacrylate and N,N-dimethyl-N-ethyl-(2-(methacryloyloxy)-ethyl-)ammonium bromide was thus obtained.

EXAMPLE 3

Two dispersions of TiO₂ in water were prepared as follows.

Sample 1: To 1 l of an aqueous solution of pH=3.2 containing 3.6% polyvinyl alcohol 323 g of TiO₂ was added while stirring at a rate of 1600 r.p.m.. After the addition of TiO₂ the mixture was stirred for 30 min. and subsequently pumped through a Dyno-Mill type KDL (registered mark) at a rate of 15l/uur. The Dyno-Mill was equipped with glass pearls with a diameter between 0.5 mm and 0.7 mm. The Dyno-Mill operated at a rate of 4500 r.p.m. and the opening of the gate was 0.1 mm. A dispersion of TiO₂ in water with a good degree of dispersion and good colloidal stability was obtained.

Sample 2: A second dispersion of TiO₂ in water was prepared in a similar manner as above with the only difference that the amount of TiO₂ was added to an aqueous solution containing 1% by weight with respect to TiO₂ of a block-copolymer of alpha-methylstyrene and N,N-dimethyl-N-ethyl-(2-(methacryloyloxy)-ethyl-)ammonium bromide and a 5% polyvinyl alcohol solution in water was added in such an amount that the final concentration of polyvinyl alcohol was 3.6%. The thus obtained dispersion exhibited an excellent degree of dispersion and an excellent colloidal stability.

EXAMPLE 4

Two dispersions of carbon black were prepared as follows.

Sample 3: To 1 l of an aqueous solution containing 31.25 g of N,N-dimethyl-N-benzyl-2-(diisobutyl-cresoxy-ethoxy)ethyl ammonium chloride was added 180 g of carbon black (Printex U obtained from Degussa) while stirring at a rate of 1400 r.p.m.. To this solution was then added 792 ml of a 5% solution of polyvinyl alcohol in water. This solution was then brought to pH=3 with a 3.6% solution of HCl in water and subsequently three times pumped through a Dyno-Mill type KDL operating under the same conditions as described in example 3. A dispersion of carbon black in water with good colloidal stability and a good degree of dispersion was thus obtained.

Sample 4: A second dispersion of carbon black in water was prepared by adding to 450 ml of water 107 ml of an aqueous solution containing 10% of a block-copolymer of methylmethacrylate and N,N-dimethyl-N-ethyl-(2-(methacryloyloxy)-ethyl)ammonium bromide. To this solution was then added 100 g of carbon black (Printex U obtained from Degussa) while stirring at a rate of 1500 r.p.m. To this solution was added 400 ml of a 5% solution of polyvinyl alcohol in water, the solution was brought to pH=3 with a 3.6% solution of HCl in water and twice pumped through a Dyno-Mill operating under the conditions described in example 3. A dispersion of excellent colloidal stability and excellent degree of dispersion was thus obtained.

EXAMPLE 5

Dispersions of TiO₂ and carbon black in water were prepared by mixing the TiO₂ dispersions, samples 1 or 2, with the carbon black dispersion, samples 3 or 4 in a ratio of 10 to 1 in volume. The degree of dispersion and colloidal stability of the different mixtures is shown in table 1.

TABLE 1

| mix of samples | degree of dispersion | colloidal stability |
|---|---|---|
| 1 and 3 | good | good |
| 1 and 4 | excellent | excellent |
| 2 and 3 | excellent | excellent |
| 2 and 4 | best | best |

From table 1 it can be seen that excellent colloidal stability is obtained when said block-copolymers according to the present invention are present.

We claim:

1. An element comprising on a support at least one layer comprising a hydrophilic binder, a metal oxide and/or carbon black and a block-copolymer which comprises at least one block of a methacrylate or acrylate monomer corresponding to the general formula:

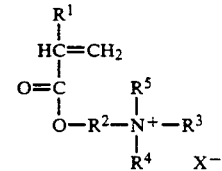

wherein R¹ represents a methyl group or hydrogen, each of R³, R⁴ and R⁵ which may be the same or different represent a hydrogen, an alkyl, aryl or alkylaryl group, R² represents a divalent organic group and X⁻ represents an anion.

2. An element according to claim 1 wherein said block-copolymer contains only two blocks.

3. An element according to claim 2 wherein said block-copolymer contains a block of alpha-methylstyrene or methyl methacrylate and a block of a methacrylate monomer that corresponds to the formula:

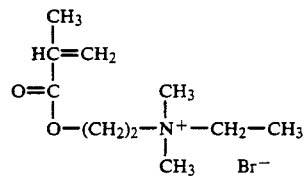

4. An element according to claim 1 wherein said metal oxide is TiO₂.

5. An element according to claim 1 wherein the hydrophilic binder is polyvinyl alcohol.

* * * * *